(12) United States Patent
Arocena De La Rua et al.

(10) Patent No.: US 9,051,921 B2
(45) Date of Patent: Jun. 9, 2015

(54) LIGHTNING CONDUCTION SYSTEM FOR WIND TURBINE BLADES WITH CARBON FIBER LAMINATES

(75) Inventors: Ion Arocena De La Rua, Sarriguren (ES); Eneko Sanz Pascual, Sarriguren (ES)

(73) Assignee: GAMESA INNOVATION & TECHNOLOGY, S.L., Sarriguren (Navarra) (ES)

(*) Notice: Subject to any disclaimer, the term of this patent is extended or adjusted under 35 U.S.C. 154(b) by 654 days.

(21) Appl. No.: 13/305,869

(22) Filed: Nov. 29, 2011

(65) Prior Publication Data

US 2012/0134826 A1    May 31, 2012

(30) Foreign Application Priority Data

Nov. 30, 2010 (ES) .................. 201001525

(51) Int. Cl.
*F03D 1/02* (2006.01)
*F03D 11/00* (2006.01)
*F03D 1/06* (2006.01)

(52) U.S. Cl.
CPC .......... *F03D 11/0033* (2013.01); *F03D 1/0675* (2013.01); *F05B 2280/2006* (2013.01); *F05B 2280/6003* (2013.01); *Y02E 10/722* (2013.01); *Y02E 10/721* (2013.01)

(58) Field of Classification Search
CPC .................. F03D 11/0033; F03D 11/0675
USPC .............. 416/146 R, 223 R, 226, 229 R, 230; 174/2, 3, 177
See application file for complete search history.

(56) References Cited

U.S. PATENT DOCUMENTS

| | | | |
|---|---|---|---|
| 2003/0170122 A1* | 9/2003 | Wobben | 416/31 |
| 2006/0280613 A1* | 12/2006 | Hansen | 416/230 |
| 2007/0074892 A1* | 4/2007 | Hibbard | 174/117 FF |
| 2008/0073098 A1* | 3/2008 | Llorente Gonzalez et al. | 174/2 |

* cited by examiner

*Primary Examiner* — Nathaniel Wiehe
*Assistant Examiner* — Woody A Lee, Jr.
(74) *Attorney, Agent, or Firm* — Ladas & Parry LLP

(57) ABSTRACT

A lightning rod system for wind turbine blades formed by various connections set up on carbon fiber laminates on the blade, equipotentializing the surface of the flanges of the beam through the deviations of a primary cable with the respective auxiliary cables, carried out with the use of a device having terminals that are connected between the ends of the cited auxiliary cable on the connection between the carbon laminates and the conductor cable or primary cable and which has elevated inductance so that it reduces the passage of current across the carbon laminate and favors the conduction through the metal cable.

4 Claims, 2 Drawing Sheets

LIGHTNING CONDUCTION SYSTEM FOR WIND TURBINE BLADES WITH CARBON FIBER LAMINATES

OBJECT OF THE PATENT

The object of the patent is to furnish a lightning conduction system for current wind turbine blades. The new lightning system is achieved by adding a device that reduces the current fraction of the lightning transmitted through the carbon fiber laminates.

BACKGROUND OF THE INVENTION

Given the height of the wind turbines and their erection in elevated regions lacking other elements having similar heights, there is a high risk of being struck by lightning, especially in the blades. With this in mind, blades must be equipped with a lightning protection system, and any other additional system installed in the blade containing conductor elements (metal parts, sensors, beacon systems, etc.) must be protected against direct impacts of lightning bolts and indirect effects of the electromagnetic field induced by the bolt current.

The primary components of the lightning protection system for wind turbine blades are a series of metal receptors mounted on the surface of the blade and a cable conductor to transit the bolt from the receptors to the blade root.

The evolution of wind turbines together with the growth in their provided power have led to new generations of wind turbines having ever-increasing dimensions insofar as tower height and rotor diameter. Blade lengthening necessitates an increase in rigidity. The use of a larger quantity of carbon fiber-based laminates in blade production is common to achieve this rigidity. However, carbon fiber laminates are conductors and must therefore be connected in parallel with the lightning protection system conductor cable to prevent internal arcing between the cable and the laminates and direct lightning bolt strikes on the carbon laminate.

In this regard, international patent WO2006051147, which presents a "lightning conductor system for wind generator blades comprising carbon fibre laminates", can be cited since the use of carbon fiber in blade beam construction requires that this material be equipotentialized with the lightning conductor system. To do so, the primary cable of the lightning conductor system is furnished with bypasses for connections directly with the carbon fiber laminates. These auxiliary cables are connected with a bolted joint to a metal plate in direct contact with the carbon fiber layers. The electrical connection can be improved with the use of additional conductor resins in the joint area.

Notwithstanding this solution, the distribution of current transmitted across the cable and carbon laminates are not controlled, which could make the transfer of current across the carbon without damaging it even more difficult, thus necessitating a device to connect the carbon fiber laminates in parallel with the cable conductor of the system and to control the current circulating through the carbon fiber as in the proposal for the present invention.

DESCRIPTION

The longer lengths of blades currently in use call for suitable reinforcement of the internal blade beam (structural element withstanding the largest stresses). The beam is thus manufactured with an increasing number of carbon fiber layers which could result in a problem (since thicker and wider laminates offer less resistance to the passage of current) in conducting strong currents through the cable coming down from the lightning conductor system instead of the beam laminate.

An object of this invention is to improve the current lightning conductor system for blades of a lesser length and with a smaller amount of carbon fiber in the laminates on the blade beam.

Another object of this invention is to include a device in at least one of the existing connections between the laminates of the carbon fiber and the conductor cable of the lightning conductor system to control the current fraction of the bolt transmitted through the carbon fiber laminates.

Another object of the invention is the current control device formed by a highly conductive element, thus reducing the current fraction of the bolt transmitted through the fiber carbon laminates.

The foregoing is attained by connecting the carbon fiber laminate with the conductor cable. Thus, the lightning protection system is converted into a two-branched circuit in parallel: one branch formed by the cable conductor, of low resistance and high inductance, and the other branch formed by the carbon laminate, having high resistance and low inductance. When lightning strikes one of the receptors on the blade, the lightning protection system must evacuate bolt current, whose waveform is characterized by having a first phase in which the current rises steeply, followed by a second phase where the current drops slowly. When this current is injected into the circuit formed by the carbon laminate connect in parallel to the cable, the current is distributed as follows:

During the steep rise phase, most of the current is transmitted by the conductor with less inductance (carbon laminate)

During the gradual drop phase, most of the current is transmitted by the conductor with less resistance (conductor cable)

With the current distribution described above, the carbon laminate undergoes a large current peak at the beginning of the discharge, whereas, based on the increased size of the blades, the inductance of the carbon laminates (wider and thicker) decreases. This provokes the fraction of the current conducted by the carbon to increase. The transmission of a lightning bolt discharge is simple to carry out in metal elements, yet complicated in carbon laminates, which contain resins that degenerate at temperatures between 100° C. and 200° C.).

The main advantage of using the high-inductance device placed in the connection between the carbon laminates and the conductor cable is that it reduces the passage of current through the carbon laminate and favors conduction through the metal cable.

Another advantage is that it is unnecessary to utilize a device in the two connections between the carbon and the conductor cable (at the beginning and end of the laminate); a mere device used at one of the two connections will suffice.

DESCRIPTION OF THE PREFERENTIAL EMBODIMENT

Figure 1:
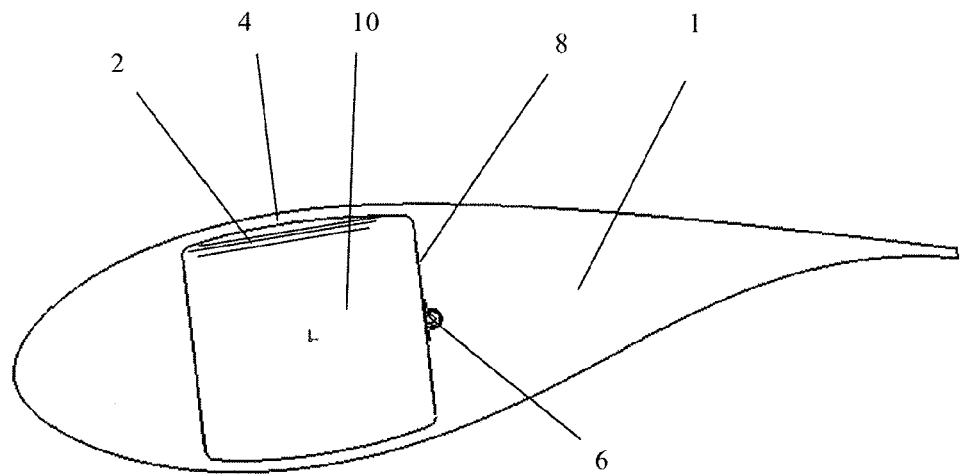
FIG. 1 represents the relative position between the carbon flanges and the cable that runs through the core in a section of the blade.

As shown in FIG. 1, the lightning conduction system in the blade (1) with carbon fiber laminates (2), object of the invention, employs a lightning conduction system based on a primary cable (6) to which, additionally, some bypasses are fitted in order to connect it directly with the carbon fiber laminates (2) thereby ensuring the equipotentiality of both systems.

Figure 2:
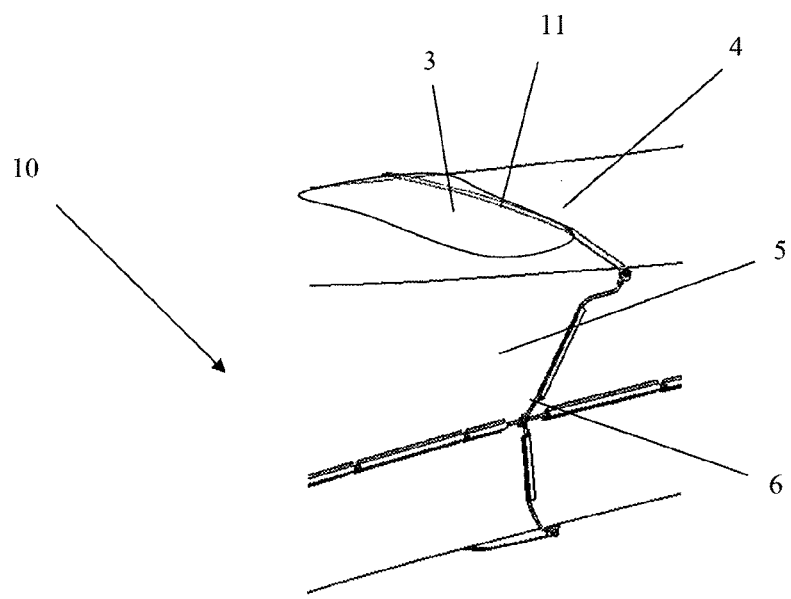
FIG. 2 shows the plate making the connection with the carbon fiber, as well as the bypasses with auxiliary cables.

As shown in FIG. 2, the bypasses are made with two connections to each one of the two carbon fiber laminates (2), the one corresponding to the upper part of the beam (10) and the one corresponding to the lower part of the beam, represented in the previous figure. These laminates are located on the two sides that are affixed to the shells of the blade known as the flanges (4). One connection is made in the beam root area and the other at the tip area so that the flanges (4) of the beam become alternative paths for the bolt. The differentiating characteristic of the system lies in the form that connections are made between the primary cable (6) and the carbon laminates (2), this is achieved by bypasses from the primary cable (6) due to small pieces of auxiliary cable (5) connected with a bolted joint to a metal plate (3). This metal plate (3) is designed to make the direct connection with the carbon (2). The plates (3) are mounted during the beam lamination process onto the beam's layers of carbon fiber and are subsequently covered with glass or carbon fiber layers employed in the later lamination of the beam. The plates (3) adhere to the laminates in the normal curing of the beam thus achieving a mechanically robust union with the beam and electrically well connected with the carbon fiber (2).

Figure 3:
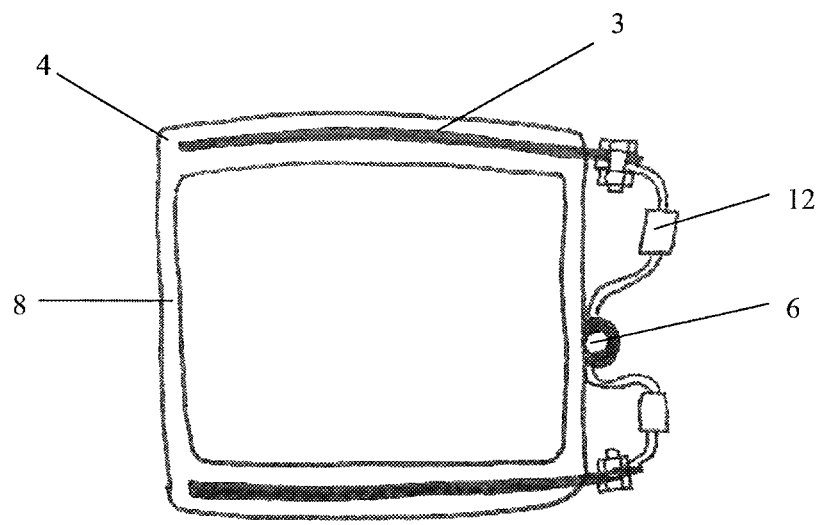
FIG. 3 shows the detail of the connection between the plate and the carbon fiber, and the bypasses of the auxiliary cable to the primary cable with the inclusion of the high-inductance device.

As shown in FIG. 3, according to the practical embodiment of the invention, this is a typical blade beam comprising two cores (8) and two flanges (4). The carbon laminates (2) used to stiffen the beam are employed in the flanges (4) of the beam (10). For this purpose, these laminates (2) are connected to the drop cable or primary cable (6) through an auxiliary conductor element (5) and connects using a bolted joint to the metal plate (3) and to the device (12) capable of reducing the passage of current across the carbon laminate (2) and thus favoring the conduction across the primary cable (6). The device (12) redistributes the current within the blade and not outside of it, hence protecting the carbon fiber (2) used in the beam of the blade (1).

The lightning conduction system device, object of this invention, is applicable to already existing lightning conduction systems. This would merely imply including the new device by cutting the existing cable and connecting it between the carbon laminate (2) and the primary cable (6). The device (12) is an inductive element whose inductance varies between 5 mH and 50 mH based on the length of the blade (which could vary between 20 and 70 meters) and is preferentially formed by coil with two terminals for ease of connection.

The invention claimed is:

1. A lightning conduction system for wind turbine blades with carbon fiber laminates, comprising a drop primary cable equipotentialized with carbon fiber laminates in different spots on the blade by bypasses from the drop primary cable with auxiliary cables connected with a bolted joint to a metal plate connected in turn to the carbon fiber laminate, wherein at least one auxiliary cable is fitted with an inductive device that has an inductance based on the length of the blade and has two connections facilitating its connection with the primary cable and with the carbon fiber laminate.

2. The lightning conduction system for wind turbine blades with carbon fiber laminates according to claim 1, wherein the device is an inductive element having an inductance that varies between 5 mH and 50 mH based on the length of the blade.

3. The lightning conduction system for wind turbine blades with carbon fiber laminates according to claim 2, wherein when the device has an inductance higher than 5 mH and this inductance is placed on the existing connection between the carbon laminates and the conductor cable or drop primary cable, the passage of current through the carbon laminate being reduced and conduction thus being favored through the metal cable.

4. The lightning conduction system for wind turbine blades with carbon fiber laminates according to claim 1, wherein when the device has an inductance higher than 5 mH and this inductance is placed on the existing connection between the carbon laminates and the conductor cable or drop primary cable, the passage of current through the carbon laminate being reduced and conduction thus being favored through the metal cable.

* * * * *